United States Patent [19]

Yao et al.

[11] Patent Number: 4,667,877

[45] Date of Patent: May 26, 1987

[54] MULTI-ORIFICE IMPULSED SPRAY GENERATOR

[75] Inventors: Shi-Chune Yao, Pittsburgh, Pa.; Nasser Ashgriz, Buffalo, N.Y.

[73] Assignee: Carnegie-Mellon University, Pittsburgh, Pa.

[21] Appl. No.: 765,678

[22] Filed: Aug. 15, 1985

[51] Int. Cl.[4] .......................... B05B 3/14; B05B 7/06; B01D 47/06

[52] U.S. Cl. ................................ 239/102.2; 239/424; 239/424.5; 261/116; 261/DIG. 48

[58] Field of Search ................... 239/4, 102, 423, 424, 239/424.5; 261/116, DIG. 48

[56] References Cited

U.S. PATENT DOCUMENTS

| | | | |
|---|---|---|---|
| 3,204,682 | 9/1965 | Teleshefsky et al. | 239/424.5 X |
| 3,469,785 | 9/1969 | Boucher et al. | 261/DIG. 48 X |
| 3,900,162 | 8/1975 | Titus et al. | 239/102 |
| 4,004,736 | 1/1977 | George | 239/102 |
| 4,031,171 | 6/1977 | Asao et al. | 261/1 |
| 4,238,425 | 12/1980 | Matsuoka et al. | 261/DIG. 48 X |

OTHER PUBLICATIONS

Development of Multi-Orifice Impulsed Spray Generators for Heterogeneous Combustion Experiments; N. Ashgrizzadeh, S. C. Yao, ASME/JSME Thermal Engineering Joint Conference Proceedings-vol. II., pp. 433-439.

*Primary Examiner*—Andres Kashnikow
*Assistant Examiner*—Patrick N. Burkhart
*Attorney, Agent, or Firm*—Buell, Ziesenheim, Beck & Alstadt

[57] ABSTRACT

A spray generator comprises a reservoir with a piezoelectric crystal affixed to its bottom surface and vertical tubes opening out of its top surface, each tube having an orifice at its tip. Spray liquid collecting around the orifices drains off without obstructing them. In another embodiment a gas chamber is superimposed on the reservoir, so that the tubes extend through the gas chamber and above it. The upper surface of the gas chamber is perforated so that gas can escape therefrom.

4 Claims, 2 Drawing Figures

MULTI-ORIFICE IMPULSED SPRAY GENERATOR

BACKGROUND OF THE INVENTION

Apparatus for generating sprays of droplets of controlled size in useful investigations of the combustion of liquid fuels and for other purposes. An impulse generator suitable for such uses was described in the inventors' paper, "DEVELOPMENT OF MULTI-ORIFICE IMPULSED SPRAY GENERATORS FOR HETEROGENEOUS COMBUSTION EXPERIMENTS", published on Mar. 20, 1983 in ASME/JSME Thermal Engineering Joint Conference Proceedings—Volume Two (pp. 433–439). That generator illustrated in FIG. 1 of the paper comprised a relatively flat reservoir to the bottom surface of which was affixed a piezoelectric crystal. The upper surface or plate was pierced with orifices. When the reservoir was filled with fluid and the crystal activated with electric pulses of controlled frequencies, streams of droplets were ejected from the orifices. The droplet size depended on the diameter of the orifices and the frequency of the electric pulses. Although that generator proved to be satisfactory in most respects, we observed that after continued use, some of the orifices became obstructed by a liquid film due to the leakage from imperfect orifices on the plate. Other disadvantages of the previous system are the difficulty of controlling the trajectories of the droplets if the orifices are not pierced perfectly on the plate, and the difficulty of repairing imperfect orifices. Also, the previous system is not well adapted to distributing gas into the spray.

SUMMARY OF THE INVENTION

We have found that the difficulties above mentioned are avoided if the structure of the generator is modified by positioning the orifices at the tips of tubes set in the upper surface of the reservoir. This construction facilitates the draining off of liquid which is deposited around the orifices. By bending the vertical tubes slightly, the initial trajectories of droplets can be modified. The tubes are preferably of somewhat larger inside diameter than the diameter of the orifices at the exit end and we also prefer to taper or round off the surfaces surrounding the orifices where they join their tube tips.

Our generator structure can be simplified for the generation of larger size droplets by replacing the orifice and tube combination with a simple thin-walled tube only. The inside diameter of the tube serves as an orifice. The thin wall of the tube facilitates the draining off of liquid which is deposited near the orifices. Our invention provides for the distribution of gas into the spray through a perforated plate forming the upper wall of a gas chamber superimposed on the reservoir. The tubes extend through the gas chamber and its upper wall.

DESCRIPTION OF PREFERRED EMBODIMENTS

Figure 1:
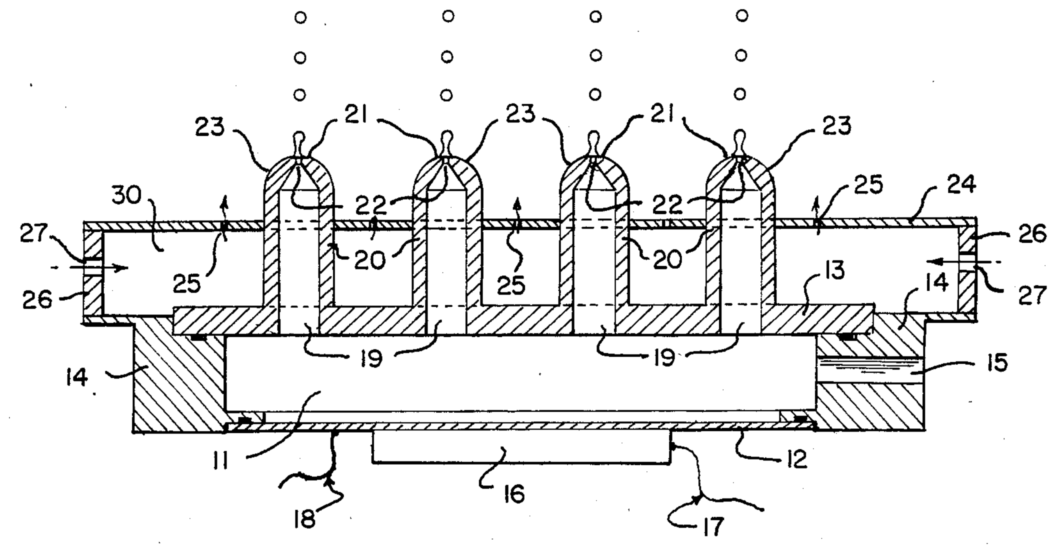
FIG. 1 is a vertical cross section through one embodiment of a spray generator modified in accordance with our invention.

An embodiment of our invention presently preferred by us and shown in FIG. 1 comprises a closed reservoir 11 having a flat bottom plate 12 and a top plate 13 spaced therefrom. It is convenient to make reservoir 11 circular in plan with a ring 14 separating top plate 13 and bottom plate 12, but the reservoir may take other shapes. A liquid intake 15 extending into the reservoir chamber is formed in ring 14. A piezoelectric crystal 16 is firmly attached to the outside surface of bottom plate 12 and is connected to a source of electric pulses not shown by conductors 17 and 18. Crystal 16 is preferably flat and of a size to extend over a substantial portion of the area of bottom plate 12.

Top plate 13 is pierced with holes 19 of somewhat larger diameter than the orifices to be described hereinafter. Holes 19 are arranged in any desired pattern covering top plate 13. At each hole 19 an upright tube 20 is affixed to top plate 13 extending thereabove and terminating at its upper end or tip in a relatively flat surface or area 21 through which an orifice 22 is pierced. The inside diameter of tube 20 is not less than the diameter of its orifice 22. The shoulder of tube 20 where the tube wall joins its orifice surface 21 is preferably rounded off or tapered at 23 away from orifice 22. Spaced above plate 13 by surrounding wall 26 is a second plate 24, through which tubes 20 extend, so as to form a gas chamber 30. Plate 24 is formed with perforations 25 located between tubes 20. Surrounding wall 26 has one or more gas inlets 27.

Figure 2:
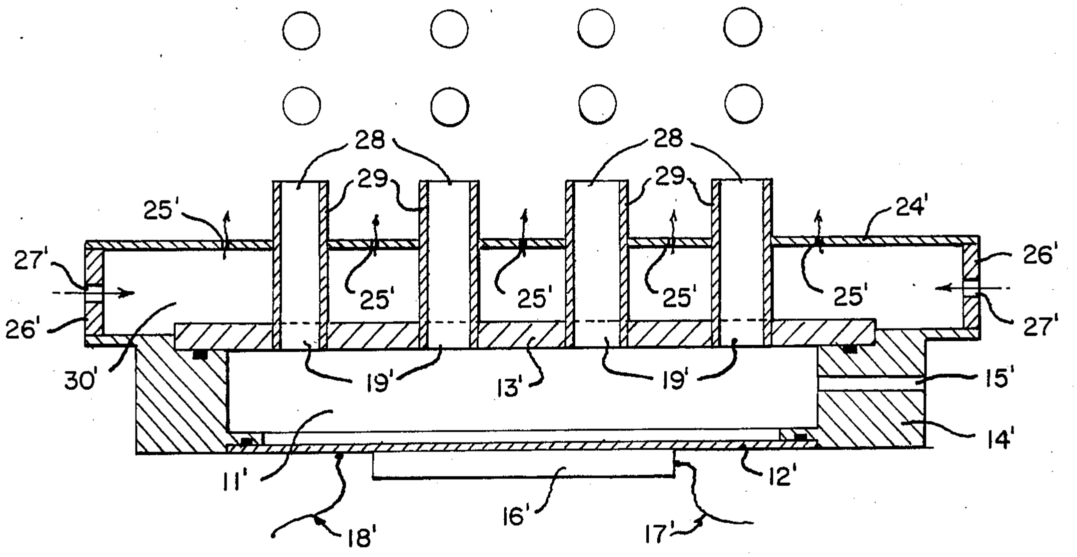
FIG. 2 is a vertical cross section through a second embodiment of our invention.

The second embodiment of our invention, shown in FIG. 2, is the same as the first embodiment described hereinabove in all respects indicated by the use of the same reference character with a prime suffix for like parts. Tubes 29, however, are preferably thin-walled tubes, and are open at their tops 28. The inside diameters of tubes 29 determine the size of their orifice tips 28. For thin-walled tubes tips 28 can be a flat edge; for a thick-walled tube the tip is rounded off or tapered as has been mentioned.

There are two modes of operation of spray generators described in our 1983 paper mentioned hereinabove, one with the reservoir unpressurized and the other with the reservoir under pressure. An unpressurized generator emits fluid only when its crystal is activated and emits that fluid as droplets. Each electric impulse applied between conductors 17 and 18 causes the piezoelectric crystal 16 to transmit a mechanical pulse to bottom plate 12 of reservoir 11, thereby causing the discharge of a droplet, which may be followed by a satellite droplet, from each orifice 22, or 28. In this mode of operation droplet arrays can be produced with axial spacings determined by the frequency of the electric impulses applied to the piezoelectric crystal 16. In the second mode, a pressurized generator emits constant streams of fluid when its crystal is not activated but the streams are broken into uniform size droplets when the crystal is activated by pulses of a chosen frequency. The number density of the droplets in the spray depends on the spacing of the tubes 20 or 29 on plate 13. Uniform size droplets can be obtained easily when the piezoelectric crystal is operated in the range of $$3.5\ D_j < (V_j/f) < 7\ D_j$$

where $D_j$ is the diameter of the liquid jet stream, $V_j$ the liquid jet stream velocity, and f the applied frequency. In either mode, however, liquid remaining on the surfaces surrounding the orifices 22 or 28 of our invention represents only a small fraction of that which deposits on the surface of the flat orifice plate disclosed in that paper and it tends to run off down the exterior of the tubes 20 or 29 away from orifices. The tapered or rounded shoulders 23 previously mentioned facilitate that runoff. Thus our apparatus operates for very substantial periods of time without orifice plugging.

As has been mentioned our invention includes a superimposed gas chamber 30 which is used when it is desired to introduce a gas along with the drops of liquid. The gas under pressure in chamber 30 escapes through perforations 25 which may be spaced as desired between tubes 20 or 29.

In the foregoing specification we have described a present preferred embodiment of our invention; however, it will be understood that our invention can be otherwise embodied within the scope of the following claims.

We claim:

1. In a generator for spraying droplets comprising a closed reservoir for spray liquid having an entry port through which said reservoir is filled, a horizontal upper surface pierced with holes and a bottom surface with means for vibrating that bottom surface attached thereto, the improvement comprising vertical tubes surrounding at least some of said holes affixed to said upper surface and extending above said surface, said port and said holes forming the only openings into said reservoir, each tube having an orifice at its tip, whereby spray liquid forced into said holes by said vibrating means as a body of liquid through said holes forms droplets on leaving said orifices and excess liquid drains off around said tubes without obstructing their orifices.

2. The generator of claim 1 in which the inside diameter of the tubes is not less than the diameter of their orifices.

3. The generator of claim 1 in which the diameter of each said tube is uniform over its length and in which the tips of the tubes slope downwardly from their orifices toward the outside of the tubes.

4. The generator of claim 1 including a gas chamber superimposed on said closed reservoir, said tubes passing entirely through said gas chamber and extending above its upper surface, said upper surface being perforated between said tubes.

* * * * *